US012712438B2

(12) United States Patent
Leppänen et al.

(10) Patent No.: US 12,712,438 B2
(45) Date of Patent: Aug. 18, 2026

(54) ARRANGEMENT FOR CURRENT SHARING OF PARALLEL-CONNECTED CONVERTERS

(71) Applicant: ABB Schweiz AG, Baden (CH)

(72) Inventors: Veli-Matti Leppänen, Helsinki (FI); Peter Muszynski, Helsinki (FI); Tero Viitanen, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 246 days.

(21) Appl. No.: 18/739,963

(22) Filed: Jun. 11, 2024

(65) Prior Publication Data

US 2024/0429808 A1 Dec. 26, 2024

(30) Foreign Application Priority Data

Jun. 21, 2023 (EP) .................................... 23180650

(51) Int. Cl.
*H02M 1/088* (2006.01)
*H02M 7/539* (2006.01)

(52) U.S. Cl.
CPC ........... *H02M 1/088* (2013.01); *H02M 7/539* (2013.01)

(58) Field of Classification Search
CPC ........ H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383;

(Continued)

(56) References Cited

U.S. PATENT DOCUMENTS 5,047,913 A * 9/1991 De Doncker ....... H02M 7/5152 363/138
5,172,309 A * 12/1992 DeDoncker ......... H02M 7/4826 363/138

(Continued)

FOREIGN PATENT DOCUMENTS

EP 524398 B1 8/1996
WO 2017079125 A1 5/2017

OTHER PUBLICATIONS

Williams A et al; Applications of an Auxiliary Resonant Commutated Pole Converter; Applied Power Electronics Conference, Apec 2007—Twenty Second Annual IEEE; Feb. 1, 2007; 5 Pages.

(Continued)

*Primary Examiner* — Crystal L Hammond
*Assistant Examiner* — Nusrat Quddus
(74) *Attorney, Agent, or Firm* — Greenberg Traurig, LLP

(57) ABSTRACT

A power converter system includes auxiliary resonant commutated pole converter legs, particularly ARCP half-bridge legs, connected in parallel between a common dc system and a common ac system or between two common dc systems. Commutations of the parallel-connected converter legs are initiated by simultaneous commutation commands. A control arrangement is provided to balance a current sharing between the parallel-connected ARCP converter legs by means of having an individual autonomous leg-specific boost current adjustment for each of the parallel-connected ARCP converter legs for adjusting boost currents in a direction that a differential output current is reduced. Each individual boost current adjustment is dependent on the magnitude of the leg current of the respective ARCP converter leg only.

17 Claims, 6 Drawing Sheets

(58) Field of Classification Search

CPC ....... H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 3/1582; H02M 3/1584; H02M 3/285; H02M 3/33561; H02M 7/49; H02M 1/045; H02M 7/006; H02M 7/06; H02M 7/068; H02M 7/153; H02M 1/088; H02M 7/103; H02M 7/106; H02M 7/19; H02M 7/08; H02M 7/17; H02M 2001/007; H02M 7/493; H02M 7/5381; H02M 7/483; H02M 7/53873; H02M 1/084; H02M 1/0845; H02M 5/2573; H02M 1/081; H02M 5/293; H02M 3/125; H02M 3/13; H02M 3/145; H02M 3/15; H02M 3/155; H02M 3/156; H02M 3/158; H02M 3/1588; H02M 2003/1566; H02M 2003/1557; H02J 3/46; H02J 3/38; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | | | |
|---|---|---|---|---|
| 5,717,582 | A * | 2/1998 | Duong | H02M 7/538 363/95 |
| 5,892,673 | A * | 4/1999 | Delgado | H02M 7/538 363/138 |
| 5,898,583 | A * | 4/1999 | Delgado | H02M 7/538 363/131 |
| 5,949,669 | A * | 9/1999 | Bruckmann | B60L 9/16 363/136 |
| 6,172,882 | B1 * | 1/2001 | Tanaka | H02M 7/5387 363/17 |
| 6,205,040 | B1 * | 3/2001 | Teichmann | G05F 1/618 363/137 |
| 6,278,626 | B1 * | 8/2001 | Teichmann | H02M 7/487 363/135 |
| 7,068,525 | B2 | 6/2006 | Kraus et al. | |
| 8,416,592 | B2 * | 4/2013 | Zhang | H02M 7/537 363/56.02 |
| 8,432,714 | B2 | 4/2013 | Keronen et al. | |
| 11,469,684 | B2 * | 10/2022 | Shi | H02M 1/083 |
| 2004/0125618 | A1 * | 7/2004 | De Rooij | H02M 7/4807 363/17 |
| 2004/0240240 | A1 * | 12/2004 | Bijlenga | H02M 7/4826 363/56.12 |
| 2004/0246746 | A1 * | 12/2004 | Norrga | H02M 7/487 363/16 |
| 2004/0246756 | A1 * | 12/2004 | Bijlenga | H02M 7/487 363/132 |
| 2005/0063124 | A1 * | 3/2005 | Lundberg | H03K 17/0828 361/111 |
| 2009/0116266 | A1 * | 5/2009 | Lai | H02M 7/493 363/40 |
| 2010/0315152 | A1 * | 12/2010 | Zhang | H02M 3/158 307/115 |
| 2016/0329828 | A1 * | 11/2016 | Zhang | H02M 1/08 |
| 2024/0146212 | A1 * | 5/2024 | Aeloiza | H02M 7/4815 |
| 2024/0178739 | A1 * | 5/2024 | Leppänen | H02M 1/0003 |
| 2024/0348180 | A1 * | 10/2024 | Viitanen | H02M 1/0009 |
| 2024/0429832 | A1 * | 12/2024 | Muszynski | H02M 7/4811 |
| 2024/0429833 | A1 * | 12/2024 | Viitanen | H02M 7/487 |
| 2025/0111980 | A1 * | 4/2025 | Viitanen | H01F 27/24 |
| 2025/0293616 | A1 * | 9/2025 | Lin | H02M 1/0058 |

OTHER PUBLICATIONS

Ke Ma et al; The evaluation of control strategies for Auxiliary Resonant Commutated Pole Inverter; Energy Conversion Congress and Exposition, 2009. ECCE; Piscataway, NJ, USA; Sep. 20, 2009; 7 Pages.

Todd D Batzel et al; Variable timing control for ARCP voltage source inverters operating at low DC voltage; Transportation Electrification Conference and Expo (ITEC), 2012 IEEE; Jun. 18, 2012; 8 Pages.

Yaogang et al; Analysis, Simulations and Experiments of a Novel ZVS -ZCS Inverter With Pulse Current Feedback Transformer Auxiliary Commutation; Conference Proceedings. IPEMC 2006. CES/IEEE 5th International Power Electronics and Motion Control Conference Aug. 14-16, 2006 Shanghai, China; IEEE, Conference Proceedings. IPEMC 2006; CES/IEEE 5th International Power Electronics and Motion Control; Aug. 14, 2006; 6 Pages.

Voss Johannes et al; Control techniques of the auxiliary-resonant commutated pole in the dual-active bridge; 2017 IEEE 12th International Conference on Power Electronics and Drive Systems;(PEDS); Dec. 12, 2017; 7 Pages.

European Search Report; Application No. EP23180650; Completed: Nov. 21, 2023; 5 Pages.

Zocher Markus et al; Adaptive Control Methods for an Auxiliary Resonant Commutated Pole Inverter; May 11, 2023; Retrieved from Internet; 7 Pages.

* cited by examiner

Fig. 4A
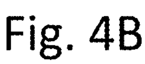
Fig. 4C
Fig. 4D
Fig. 4E
Fig. 4F
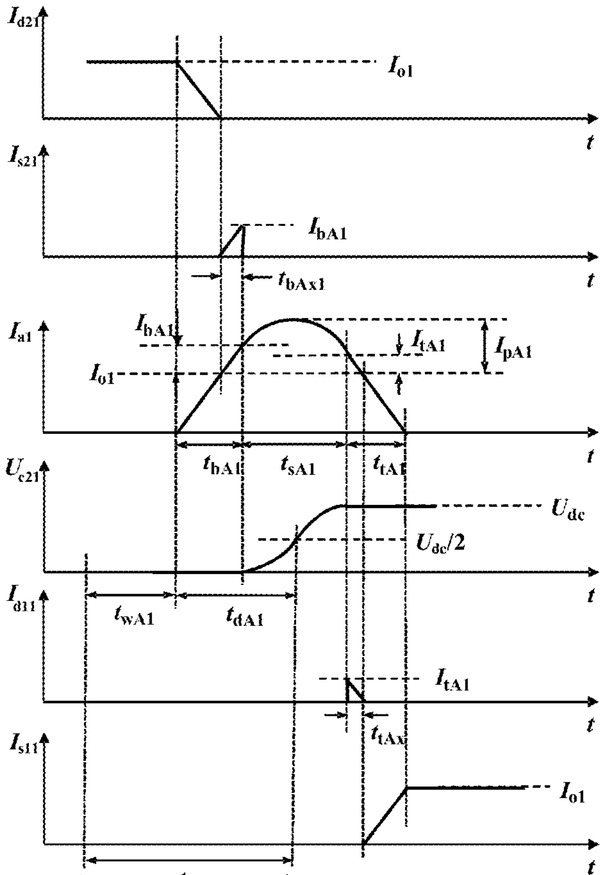
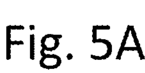
Fig. 5B
Fig. 5C
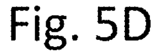
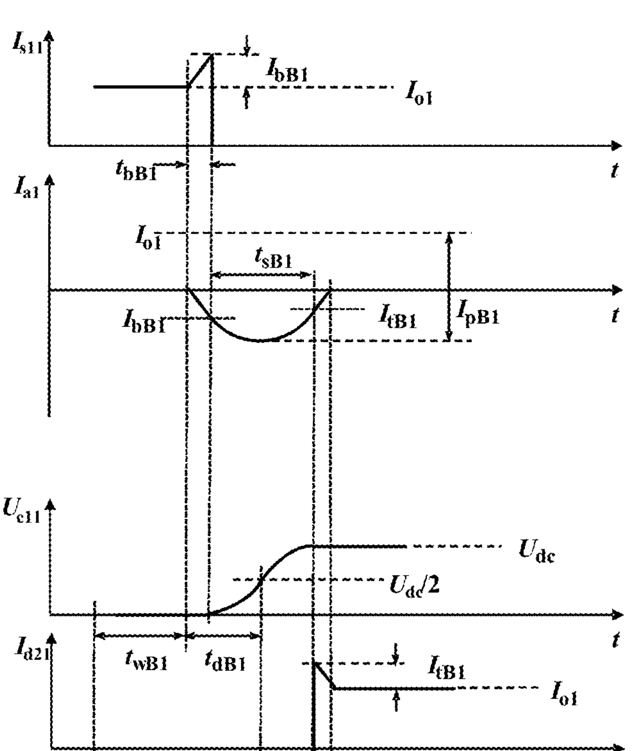

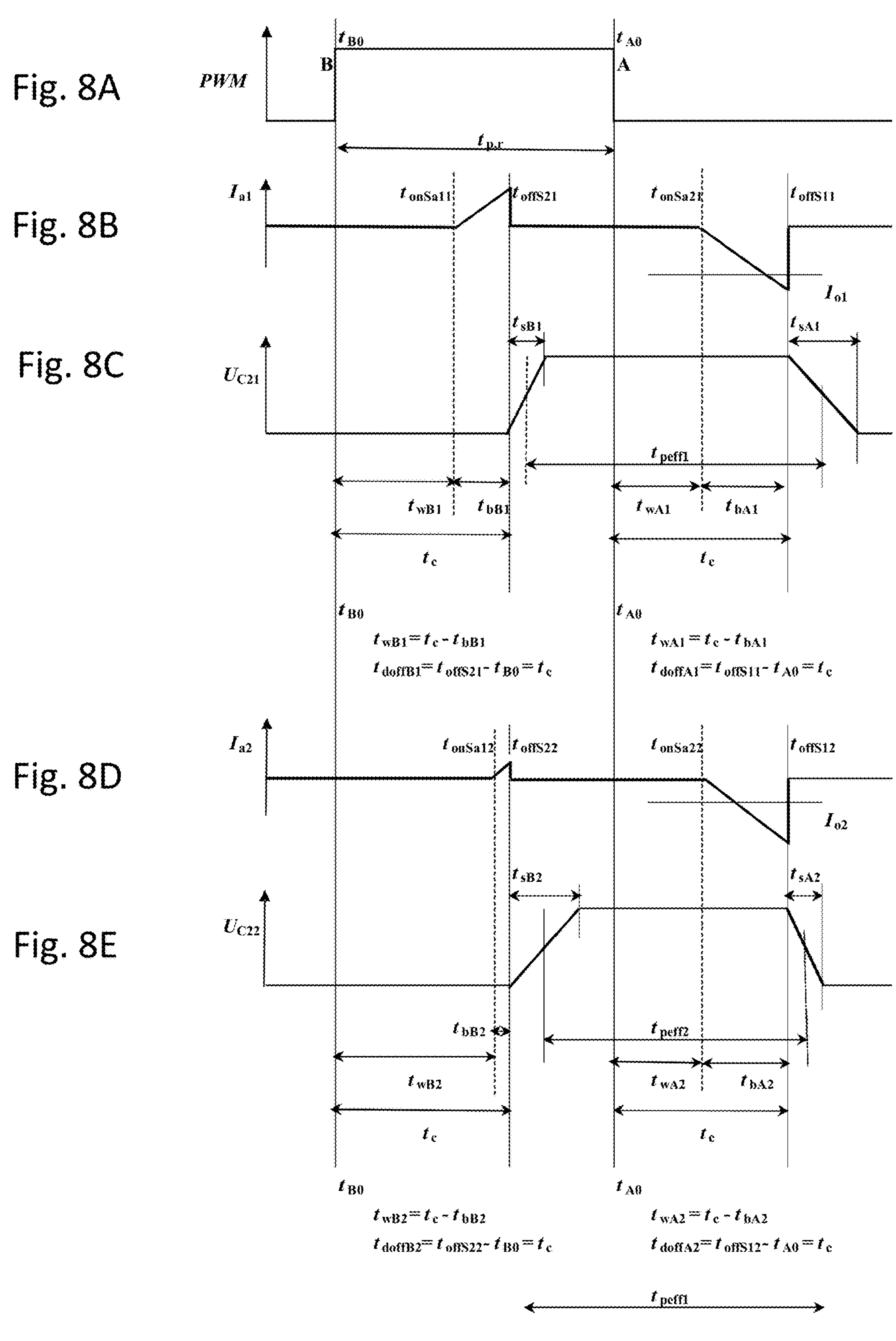

Fig. 8A
PWM
B
A
$t_{B0}$
$t_{A0}$
$t_{p.r}$
Fig. 8B
$I_{a1}$
$t_{onSa11}$
$t_{offS21}$
$t_{onSa21}$
$t_{offS11}$
$I_{o1}$
Fig. 8C
$U_{C21}$
$t_{sB1}$
$t_{sA1}$
$t_{peff1}$
$t_{wB1}$
$t_{bB1}$
$t_{wA1}$
$t_{bA1}$
$t_c$
$t_c$
$t_{B0}$
$t_{A0}$
$t_{wB1}=t_c-t_{bB1}$
$t_{doffB1}=t_{offS21}-t_{B0}=t_c$
$t_{wA1}=t_c-t_{bA1}$
$t_{doffA1}=t_{offS11}-t_{A0}=t_c$
Fig. 8D
$I_{a2}$
$t_{onSa12}$
$t_{offS22}$
$t_{onSa22}$
$t_{offS12}$
$I_{o2}$
Fig. 8E
$U_{C22}$
$t_{sB2}$
$t_{sA2}$
$t_{bB2}$
$t_{peff2}$
$t_{wB2}$
$t_{wA2}$
$t_{bA2}$
$t_c$
$t_c$
$t_{B0}$
$t_{A0}$
$t_{wB2}=t_c-t_{bB2}$
$t_{doffB2}=t_{offS22}-t_{B0}=t_c$
$t_{wA2}=t_c-t_{bA2}$
$t_{doffA2}=t_{offS12}-t_{A0}=t_c$
$t_{peff1}$
$t_{peff2}$

ARRANGEMENT FOR CURRENT SHARING OF PARALLEL-CONNECTED CONVERTERS

TECHNICAL FIELD

The present invention relates to parallel-connected power converters and more particularly to a current sharing of parallel-connected power inverters and rectifiers.

BACKGROUND

A dc-ac or ac-dc converter, also known as an inverter or a rectifier respectively, converts power from dc to ac or ac to dc system at desired voltages and frequencies. The inverter therefore can be operated as an adjustable-frequency voltage source. The dc power input to the inverter may be obtained from an existing power supply network through a rectifier or from a battery, fuel cell, photovoltaic array, etc. The filter capacitor(s) across the input terminals of the inverter provides a fairly constant dc-link voltage. A configuration of ac to dc rectifier and dc to ac inverter may be called a dc-link converter.

In some situations, a power inverter with an increased output power capability is implemented by connecting a plurality of inverter units in parallel with one another to feed the same load The parallel-connected inverter units may receive simultaneous and similar control signals to provide a desired output of the power inverter. However, due to parameter differences of switch components and differing impedances in parallel branches, the currents between the units can be unequal in magnitude. Such a current imbalance can stress the components unevenly and wear switch components with higher current prematurely. A higher current in a switch component can result in a higher dissipated power and, further, a higher temperature of the component.

Current imbalance has been addressed by modifying switch control pulses in order to balance the currents. The control pulses can be modified by delaying a turn-on time instant for a switch that has the highest current or by delaying turn-off time instants for a switch that has the smallest current. One such method is disclosed in EP0524398. In these solutions, the conducting times of the parallel components are modified to equalize stresses to the switch components on the basis of measured inverter unit currents.

U.S. Pat. No. 8,432,714 discloses a method for balancing load between parallel-connected inverter modules wherein temperatures of each output leg of each inverter module are determined and the switching instructions for one or more of the parallel inverter modules are modified for controlling the temperatures of the output legs.

WO2017/079125A1 discloses a method wherein the output voltages of all the parallel connected power devices are measured, and the measuring results are used for mitigating timing differences during output voltage state changes caused e.g. by gate driver circuit and switching component parameter tolerances.

U.S. Pat. No. 7,068,525 discloses a method of operating multiple parallel-connected inverters by regulating the individual currents of the inverters separately.

SUMMARY

An object of the present invention to provide an improved power converter system having two or more parallel-connected converter legs. The power converter system is recited in the independent claim. Preferred embodiments are disclosed in the dependent claims.

An aspect of the invention is a power converter system, comprising two or more converter legs connected in parallel between a common dc system and a common ac system or between two common dc systems, wherein commutations of the parallel-connected converter legs are initiated by simultaneous commutation commands, a control arrangement configured to balance the current sharing between the parallel-connected converter legs, wherein the parallel-connected converter legs are auxiliary resonant commutated pole (ARCP) converter legs, particularly ARCP half-bridge legs, and wherein the control arrangement is configured to balance the current sharing between the parallel-connected ARCP converter legs by means of having an individual autonomous leg-specific boost current adjustment for each of the parallel-connected ARCP converter legs for adjusting boost currents in a direction that a differential output current is reduced, wherein each individual boost current adjustment is dependent on the magnitude of the leg current of the respective ARCP converter leg only.

In an embodiment, each individual boost current adjustment is dependent on the leg current of the respective ARCP converter leg to autonomously adjust a boost current and/or a boost time of the respective parallel-connected ARCP converter leg, and/or a timely behaviour of a voltage swing of the respective parallel-connected ARCP converter leg.

In an embodiment, each individual boost current adjustment is configured to be dependent on the magnitude of the leg current of the respective ARCP converter legs such that in an ARCP commutation mode A the higher is the magnitude of the leg current the later and/or slower is the is voltage swing, and in an ARCP commutation mode B, the higher is the magnitude of the leg current the earlier and/or faster is the voltage swing.

In an embodiment, each individual boost current adjustment is configured to be dependent on the magnitude of the leg current of the respective ARCP converter leg such that in an ARCP commutation mode A, the higher is the magnitude of the leg current the lower is the boost current and/or the shorter is a boost time, and in an ARCP commutation mode B, the higher is the magnitude of the leg current the higher is the boost current and/or the longer is the boost time.

In an embodiment, each individual boost current adjustment has the same predetermined dependence on the leg current of the respective ARCP converter leg.

In an embodiment, in an ARCP commutation mode A, the boost current in each parallel-connected ARCP converter leg is autonomously decreased from a reference value as a function of the actual value of the leg current of the respective leg in such a way that a converter leg with a higher output current will decrease its boost current more than an converter leg with a lower leg current.

In an embodiment, in the ARCP commutation mode A, each individual boost current adjustment is dependent on the magnitude of the leg current of the respective ARCP converter leg approximately according to an equation wherein $$I_{bAn} = |I_{on}|(k_{IA} - 1) + I_{bA,r}$$

n is an index $I_{bAn}$ is the boost current of the ARCP converter leg n $I_{on}$ is the leg current of the ARCP converter leg n $k_{IA}$ is a multiplier factor, $0 \leq k_{IA} < 1$ $I_{bA,r}$ is a reference boost current.

In an embodiment, in an ARCP commutation mode B, the boost current in each parallel-connected ARCP converter leg is autonomously increased from a reference value as a function of the actual value of the leg current of the respective leg in such a way that an converter leg with a higher leg current will increase its boost current more than an converter leg with a lower leg current.

In an embodiment, in the ARCP commutation mode B, each individual boost current adjustment is dependent on the magnitude of the leg current of the respective ARCP converter leg approximately according to an equation $$I_{bBn} = I_{bB,min} + k_{IB}|I_{on}|$$

wherein n is an index $I_{bBn}$ is the boost current of the ARCP converter leg n $I_{on}$ is the leg current of the ARCP converter leg n $k_{IB}$ is a multiplier factor, $k_{IB} \geq 0$ $I_{bB,min}$ is a minimum boost current that is deemed necessary if $I_o$ is zero.

In an embodiment, the power converter system comprises two or more ARCP converters, each of the ARCP converters comprising one or more ARCP converter phase legs, wherein the parallel-connected ARCP converter legs are the corresponding ARPC converter phase legs of the two or more converters connected in parallel.

In an embodiment, each of two or more ARCP converters comprises a dc-link having a first DC rail and a second DC rail, and a series connection of at least two dc-link capacitances between the two rails of the dc-link, a midpoint of the series connection forming a neutral point (NP) of the dc-link, and wherein each of said ARCP converter phase legs comprises:

a series connection of at least two main switching devices between a first DC voltage rail and a second DC voltage rail to alternatively connect the first and second dc-link rails to a phase leg output or input by the PWM modulation from the control apparatus, a resonant capacitor connected in parallel with each of the at least two main switching devices in such manner that at least one terminal of the capacitor is connected to one of the dc-link rails or to the phase leg output or input, and a series connection of a resonant inductance and at least one bi-directional auxiliary switch between said phase leg output or input and said neutral point, and wherein the control arrangement is configured to the control arrangement is configured to control the switching of the at least one bi-directional auxiliary switches to balance the current sharing between the parallel-connected ARCP converter phase legs by means of having the individual autonomous boost current adjustment for each of the parallel-connected ARCP converter phase legs, wherein each individual boost current adjustment has the same predetermined dependence on the magnitude of the leg current of the respective ARCP converter leg.

In an embodiment, the control arrangement comprises converter-specific controllers for the two or more ARCP converters, each of the converter-specific controllers being configured to provide the autonomous individual boost current adjustment for each of the ARCP converter phase legs of the respective ARCP converter.

BRIEF DESCRIPTION OF THE DRAWINGS

In the following the invention will be described in greater detail by means of exemplary embodiments with reference to the accompanying drawings, in which

FIG. 3 is a schematic block diagram of an ARCP switching controller having a PWM modulator and ARCP control functions;

FIGS. 5A-5D are diagrams illustrating an example of mode B commutation;

FIGS. 8A-8E are signal diagrams illustrating an example of the effect of the boost current adjustment according to exemplary embodiments for two parallel-connected ARCP inverter legs.

DETAILED DESCRIPTION

A dc-ac or ac-dc converter, also known as an inverter or a rectifier respectively, converts power from dc to ac or ac to dc power system at desired voltages and frequencies. Further, a dc-dc converter, such as a dc chopper, converts power from dc to dc power system. Although embodiments are described using inverters and inverter systems as examples, the invention is similarly applicable to rectifiers and rectifier systems as well as dc-dc converters. Inverter and rectifier can be exactly similar in structure and the control operations can be similar, the difference being the direction of a power flow. When a converter operates as an inverter (dc/ac converter), it converts the power from a dc system to an ac system, i.e., the ac side of the converter is referred as an output side and the dc side is considered as an input side. When a converter operates as a rectifier (ac/dc converter), it converts power from an ac system to a dc system, i.e., the ac side of the converter is considered as an input side and the dc side is considered as an output side. Further, connecting ac/dc and dc/dc converters in back-to-back configuration, i.e. dc-sides connected together, between two ac systems, one of the converters is operating in rectifier mode and the other in inverter mode, depending on the power flow direction. Operation modes of the converters may vary during the operation, as power flow may vary.

Figure 1:
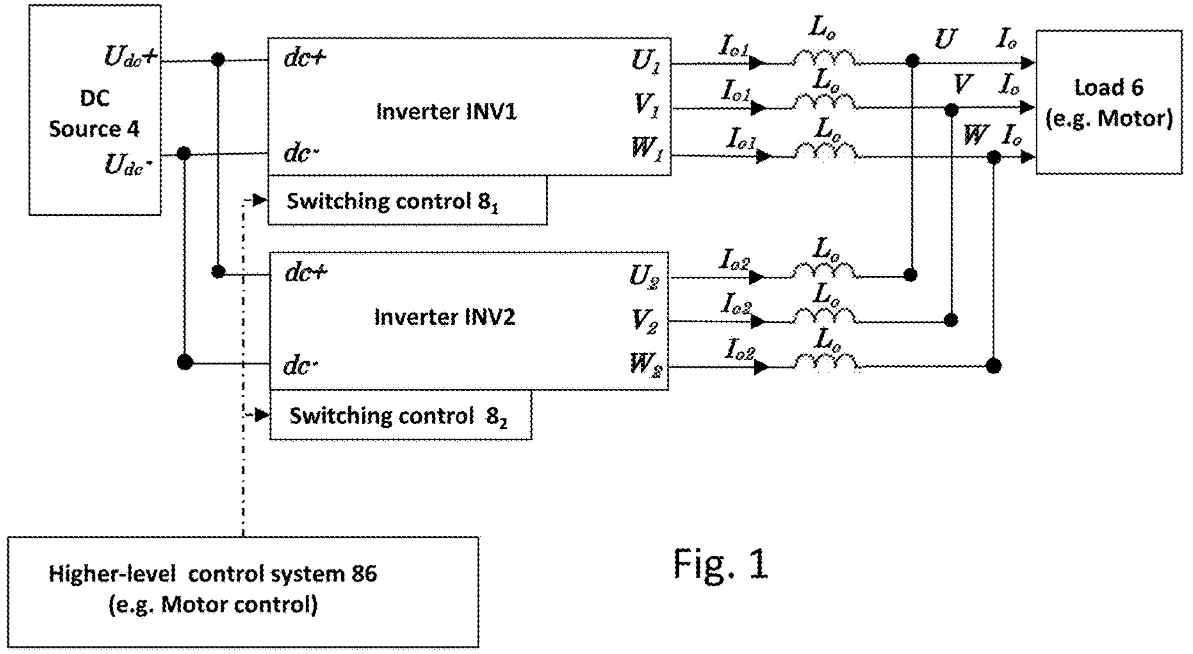
FIG. 1 is a block diagram that schematically illustrates an exemplary inverter system having a plurality of parallel-connected inverters.

FIG. 1 shows a block diagram that schematically illustrates an exemplary inverter system having a plurality of (i.e., two or more) inverters INV1, INV2, . . . , INVN connected in parallel from their DC side (e.g., DC link) terminals (e.g., dc+, dc−) and their AC side terminals (e.g., $U_1$, $V_1$, $W_1$, $U_2$, $V_2$, $W_2$). In the illustrated example, the inverters INV1 and INV2 are three-phase inverters providing three phase outputs $U_1$, $V_1$, $W_1$ and $U_2$, $V_2$, $W_2$, but it should be appreciated that parallel-connected inverters may be implemented as single-phase inverters, or generally include any number of inverter phases or phase legs. The parallel-connected inverters are fed by a common DC voltage source 4 with voltage $U_{dc}$, and inverters are feeding a common AC load 6. A typical application area of the parallel-connected inverters fed by a common DC voltage source 4 is an electric motor drive having an AC electric motor as a common load 6. There is a non-zero impedance at each phase output of each inverters, represented by inductances Lo in FIG. 1. The output inductances Lo may be intentionally implemented (e.g., a coil, a choke, etc.) or it may be just some leakage impedance of practical components and materials, such as cabling. The output inductances Lo may be substantially equal, but it must not necessarily be so. The corresponding phase outputs $U_1$, $U_2$, $V_1$, $V_2$, and $W_1$, $W_2$ of the parallel-connected inverters INV1 and INV2 are connected through the output inductances Lo to the common phase outputs U, V, and W, respectively. The corresponding phase outputs $U_1$, $U_2$, $V_1$, $V_2$, and $W_1$, $W_2$ of the parallel-connected inverters INV1 and INV2 may be connected together right after the output inductances Lo, and a single cable or multiple cables per phase U, V, and W may be used to connect the phase outputs to the load 6. Alternatively, each parallel-connected inverters INV1 and INV2 can be connected by means of its own cabling to the load 6, and the phase outputs $U_1$, $U_2$, $V_1$, $V_2$, and $W_1$, $W_2$ can be connected in parallel first at the terminals of the load 6. Output phase current Io of each phase U, V, W supplied to the load 6 is formed by combining phase output currents $I_{o1}$ and $I_{o2}$ of the respective phase outputs $U_1$, $U_2$, $V_1$, $V_2$, and $W_1$, $W_2$ of the parallel-connected inverters INV1 and INV2. The common DC supplied parallel-connected inverter modules INV1 and INV2 can be controlled to act like one high power inverter. This can be achieved by controlling the parallel inverter units with essentially same control commands.

Each inverter module INV1 and INV2 may have one or more bridge circuits (a full bridge or a half bridge), one bridge circuit for each inverter phase or phase leg. The bridge circuits of the same phase of different inverter modules are connected in parallel with one another. Each bridge circuit can include a plurality of electronic switching elements or devices (e.g. insulated gate bipolar transistors (IGBTs) that operate in a switch mode, meaning that that they are controlled to transition from a blocking state (OFF state) to a conducting state (ON state), and vice-versa, by providing control pulses (often called switching control signals or gating signals) at a high switching frequency. In a PWM modulation scheme, the width of control pulses provided to the control inputs of the switching devices is varied to provide a desired output of the inverter. The parallel-connected inverter modules INV1 and INV2 may have a common switching control that provides switching signals or gating signals to operate switching devices of all inverter modules, or more preferably, each parallel-connected inverter module INV1 and INV2 may have a dedicated switching control unit $\mathbf{8}_1$ and $\mathbf{8}_2$ that provides switching signals or gating signals to operate switching devices of the respective inverter module, as illustrated in FIG. 1. Alternatively, the control may be distributed among a common switching control unit and inverter module-specific switching control units. In the latter cases, the inverter modules may be normal inverter modules (i.e., that can be used as single units) that can be connected in parallel as such. In embodiments, the switching control(s) $\mathbf{8}_1$ and $\mathbf{8}_2$ of the parallel-connected inverter modules INV1 and INV2 may be controlled by a higher-level control system 86 with simultaneous and essentially similar control signals or commands.

In embodiments, the higher-level control system 86 may be an electric motor control.

Electronic switching devices, e.g., IGBTs, have a finite switching time, i.e. they cannot instantly switch from the conductive to the blocking state and vice versa. During this transition interval (commutation), the switch neither completely blocks nor fully conducts, and therefore, neither the voltage across the switch nor the current through the switch is zero. In other words, there is a considerable overlap between voltage and current waveforms. This simultaneous presence of voltage across the switch and current through it means that, during this overlapping period, power is being dissipated within the device. This power loss, called "a switching loss", reduces efficiency of the inverter, and when dissipated in the switch causes a major thermal stress on the switching device. The ability of a switching device to remove heat is limited. As the heat load increases, temperature rises which, in turn, degrades performance. Soft-switching techniques aim to eliminate the switching losses by forcing a zero-voltage or a zero-current condition on the switch during a switching event. Switching at zero-voltage crossing is called zero-voltage switching (ZVS) whereas switching at zero-current crossing is called zero-current switching (ZCS). The auxiliary resonant commutated pole (ARCP) inverter is one of the most promising approaches for soft-switching inverters and has distinct potential benefits in a motor drive application. The ARCP inverter can be implemented using various topologies, which all perform essentially similarly. The output voltage wave form during commutation can be shaped to be motor friendly via suitable resonant circuit parameter selections. The stress in motor insulation and bearings is thus reduced. The basic configuration and operation of ARCP is described, for example, an article "The auxiliary resonant commutated pole converter", IEEE-IAS Conference Proceedings 1990, pp. 1228-35, and in U.S. Pat. No. 5,047,913 by R. W. De Doncker et al.

According to an aspect of the invention, the inverter system is an auxiliary resonant commutated pole (ARCP) inverter system, comprising a plurality of (i.e., two or more) ARCP inverters INV1, INV2, . . . , INVN connected in parallel from their DC side (e.g. DC link) input terminals and their AC side output terminals (e.g., $U_1$, $V_1$, $W_1$, $U_2$, $V_2$, $W_2$). In embodiments, an ARCP inverter comprises series-connected dc-link capacitances of equal size between the negative (N) and the positive (P) dc-link rails of the dc-link side of the inverter. At a midpoint, called a neutral point (NP), of capacitances there is provided a neutral point potential $U_{NP}$ that essentially corresponds to half of the voltage $U_{dc}$ between the dc rails. Each phase of the inverter is associated with at least one resonant capacitor to force zero-voltage turn-off switching conditions. Further, an auxiliary branch comprising a resonant inductor and auxiliary switching device(s) is connected between the neutral point and a phase output to operate under zero current switching conditions In the ARCP commutation is accomplished through the auxiliary circuitry in a finite amount of time. The auxiliary circuit is only used when the output is required to commutate from one voltage rail to the other. In order to ensure that the inverter output voltage at least reaches the positive and negative dc rail voltages during each resonant commutation cycle, a boost current is added to the resonant current by appropriately controlling the conduction times of the auxiliary switching devices. A predetermined boost current level in the inductor adds sufficient energy to the resonant operation to ensure that the output voltage attempts to overshoot the respective converter antiparallel diode and clamping the output voltage to the respective rail voltage. Ideally, the main switches turn on and off in a zero-voltage condition, and the auxiliary switch(es) in zero-current condition, which reduce the occurring switching losses. Consequently, the switching frequency can be increased without a considerable loss penalty. Low acoustic noise of such a drive is appreciated in many applications. High switching frequency also enables higher fundamental output frequencies with low distortion, making the ARCP topology attractive for high-speed drive applications.

Figure 2:
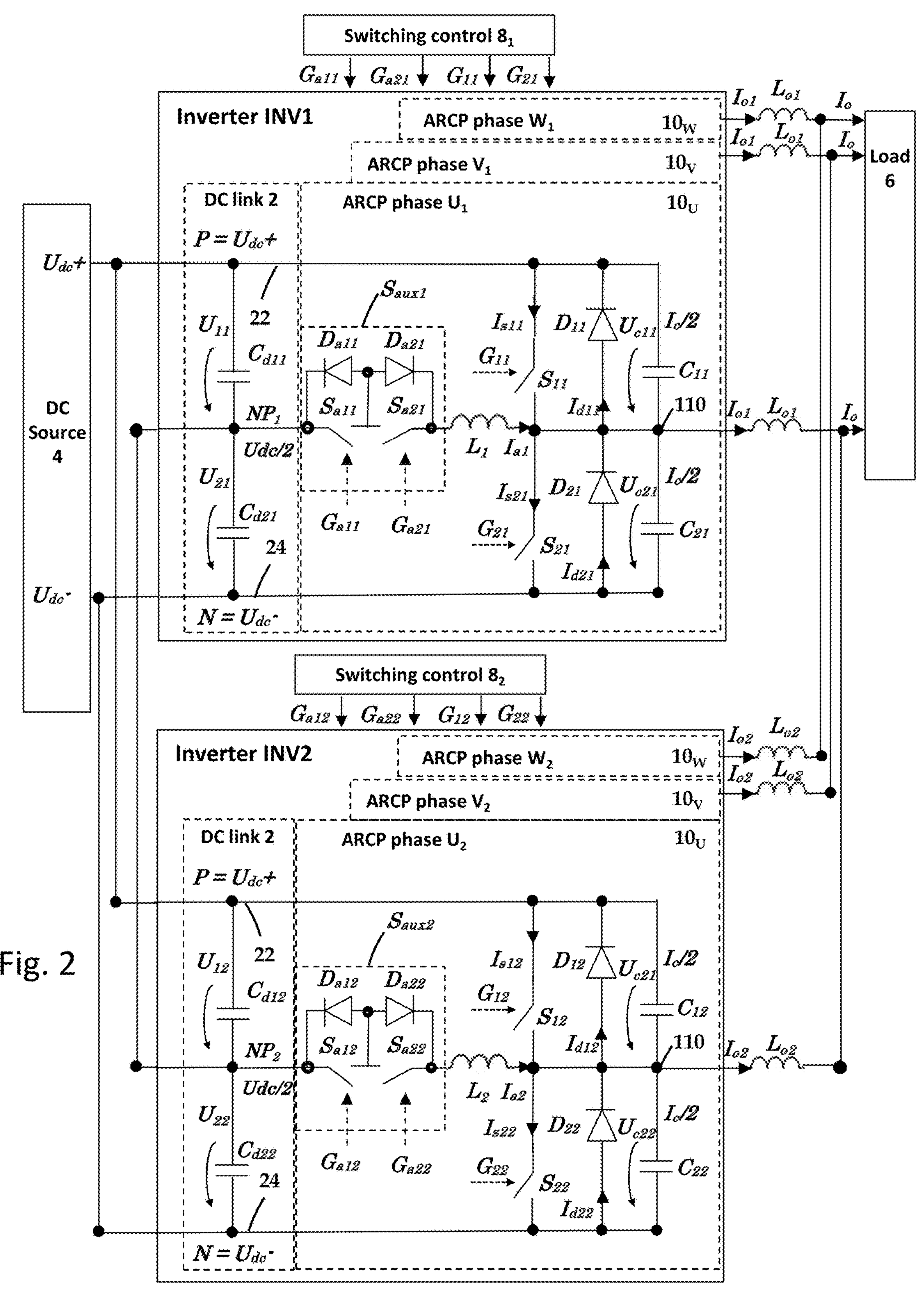
FIG. 2 is a schematic block diagram of an exemplary ARCP inverter system having a plurality of parallel-connected inverters.

The schematic of an exemplary ARCP inverter system having a plurality of (i.e., two or more) inverters INV1, INV2, . . . , INVN connected in parallel is illustrated in FIG. 2 and described herein in order to alleviate comprehending operation and configuration of embodiments of the invention in relation to an exemplary basic ARCP. It is not intended to limit embodiments of the invention to the described and illustrated exemplary ARCP(s) with only two parallel inverters. It shall be appreciated that the current sharing control according to embodiments of the invention is universally applicable to any type of ARCP inverters and their derivates and modifications regardless the specific design, configuration, and operation variations of an inverter from a basic ARCP inverter.

The parallel-connected ARCP inverters INV1 and INV2 may preferably be identical modules having the same configuration and operation. The exemplary ARCP inverter INV1 illustrated in FIG. 2 includes a DC-link 2 comprising a first dc-link rail 22, and a second dc-link rail 24, a first dc-link capacitor $C_{d11}$ coupled with the first dc-link rail 22 and a dc-link midpoint, called a neutral point NP1, and a second dc-link capacitor $C_{d12}$ coupled with the second dc-link rail 24 and the neutral point NP1. During operation, the first dc-link rail 22 is at a first voltage, so called positive (P) dc-link potential, and the second dc-link rail 24 is at a second voltage lower than the first DC voltage, so called negative (N) dc-link potential, and the dc-link midpoint NP1 is at a midpoint voltage, so called neutral point voltage $U_{NP}$. The capacitances of the dc-link capacitors $C_{d11}$ and $C_{d21}$ are substantially equal, for example $C_{d11}=C_{d21}=2C_{dc}$, so that the voltages $U_{11}$ and $U_{21}$ provided across the dc-link capacitors $C_{d1}$ and $C_{d2}$ series-connected between the dc-link rails 22 and 24 are substantially equal, i.e. a half of a dc-link voltage $U_{dc}=U_{11}+U_{21}$ between the dc-link rails 22 and 24. Thus, also the neutral point voltage or potential $U_{NP}$ essentially corresponds to half of the voltage $U_{dc}$, in other words $U_{NP}=U_{dc}/2$. The exemplary ARCP inverter INV2 includes a similar DC link 2 having dc-link rails 22 and 24, dc-link capacitors $C_{d21}$ and $C_{d22}$, voltages $U_{21}$ and $U_{22}$, and dc-link midpoint $NP_2$.

The dc-link rails 22 of the parallel-connected ARCP inverters (positive dc-link potentials P) are connected to each other and to a first voltage terminal $U_{dc+}$ of the common DC power source 4. The dc-link rails 24 of ARCP inverter modules (negative dc-link potentials N) are connected to each other and to a second voltage terminal $U_{dc-}$ of the common DC power source 4. Further, the neutral points NP1 and NP2 of the parallel-connected ARCP inverter modules may be connected to each other as shown in FIG. 2. The connection of the neutral points NP1 and NP2 is not essential to this invention, and they may as well be not connected to each other. The common dc power input to the parallel-connected ARCP inverter modules INV1 and INV2 may be obtained from any kind of a dc power source 4, such as from an existing power supply network through a rectifier, or from a battery, fuel cell, photovoltaic array, etc. It shall be appreciated that dc-link 2 may be provided in a number of forms and may have a number of voltages and other attributes. It shall also be appreciated that the voltage difference between positive and negative dc-link rails is flexible, depending on how the dc-link 2 is charged or how the dc-link 2 is discharged by the connected circuits. For example, some embodiments may use a front-end isolation transformer and rectifier connected to the dc-link with the positive and negative rails floating and the differential voltage typically in the range of 50V-1500V, but in principle in other voltages outside this range as well. In other embodiments, the positive rail, mid-point, or negative rail may be grounded to earth. Preferably, the positive and negative rails are balanced. For example, if the dc-link neutral point NP is at 0 VDC, dc-link rail 22 would be at a positive voltage (e.g., in the range of +25 VDC to +500 VDC, the range of in the range of +150 VDC to +400 VDC or other positive voltage ranges) and dc-link rail 24 would be at a negative voltage corresponding to the positive voltage (e.g., in the range of −25 VDC to −500 VDC, the range of in the range of −150 VDC to −400 VDC or other negative voltage ranges corresponding to the other positive voltage ranges). It shall be appreciated that the foregoing examples are few of many voltage magnitudes and polarities that may be present in or associated with the operation of dc-link 2. It shall be additionally appreciated that the voltage magnitudes of the foregoing examples may be subject to fluctuation, margins of error, tolerance, and other variations and may not be rigidly fixed to the precise example magnitudes stated. It shall be further appreciated the term bus may be utilized in place of the term link such that, for example, references to a dc-link are understood to encompass a dc-bus and vice versa.

The exemplary ARCP inverters INV1 and INV2 illustrated in FIG. 2 may be three-phase bridge ARCP inverters including a power section 10*u*, 10*v*, and 10*w* for each phase or phase leg $U_1$, $U_2$, $V_1$, $V_2$, $W_1$ and $W_2$, respectively. Operation and configuration of the inverters INV1 and INV2 are illustrated and described in more detail primarily with respect to one phase or phase leg $U_1$ and $U_2$ herein, but the other phases or phase legs $V_1$, $V_2$, $W_1$ and $W_2$ of the inverters INV1 and INV2 can have identical operation and configuration. In the ARCP inverter INV1, the power sections 10*u*, 10*v*, and 10*w* of phase legs $U_1$, $V_1$ and $W_1$ may be connected to the positive dc-link rail 22, the neutral point NP1, and the negative dc-link rail 24 of the common dc-link 2, and thereby to the negative (N), the neutral point (NP) and the positive (P) dc-link potentials, as illustrated in FIG. 2. The output node 110 of each power section 10*u*, 10*v*, and 10*w* is connected to the corresponding phase of an ac load 6, such as an ac motor or ac grid or any applicable electric load, via a non-zero impedance (presented generally by an output inductance $L_{o1}$ herein), which can consist of the impedance of connecting cable or busbar and it can also have additional elements if needed. In the ARCP inverter INV2, the power sections 10*u*, 10*v*, and 10*w* of phase legs $U_2$, $V_2$ and $W_2$ may be connected to the common dc-link 2 of the inverter INV2 in a similar manner as in the inverter INV1. The phase output node 110 of each power section 10*u*, 10*v*, and 10*w* of the inverter INV2 is connected to the corresponding phase of the ac load 6 via a non-zero impedance (presented generally by an output inductance $L_{o2}$ herein), and thereby each phase output of the inverter INV2 is connected in parallel with the corresponding phase output of the inverter INV1. It should be appreciated that although a three-phase ARCP inverter is illustrated as an example herein, an ARCP inverter may be implemented as a single-phase inverter, or generally include any number of inverter phases or phase legs. Moreover, although a half-bridge ARCP inverter is illustrated as an example herein, the ARCP inverter may have other configurations, particularly a full-bridge configuration.

The exemplary half-bridge power section 10*u* of the ARCP inverter INV1 illustrated in FIG. 2 includes a pair of main or power switching devices $S_{11}$ and $S_{21}$ coupled in parallel to the dc-link rails 22 and 24 of the dc-link 2. The first main switching device $S_{11}$ may have a first terminal electrically coupled to the positive dc-link rail 22 and a second terminal electrically coupled to an output node 110. The second main switching device $S_{21}$ having a first terminal coupled to output node 110 and a second terminal coupled to the negative dc-link rail 24. Across the first main switching device $S_{11}$ between the positive dc-link rail 22 and the output node 110 is connected a first antiparallel diode $D_{11}$, and across the second main switching device $S_{21}$ between the output node 110 and the negative dc-link rail 24 is connected a second antiparallel diode $D_{21}$. Further, a first resonant capacitor $C_{11}$ is operationally connected (i.e., directly or via additional components, such as an active or passive damping circuit series connected with the resonant capacitor) in parallel with the first main switching device $S_{11}$, and a second resonant capacitor $C_{21}$ is operationally connected in parallel with the second main switching device $S_{21}$. More generally, there may be one or more resonant capacitors connected in such manner that at least one terminal of the resonant capacitor(s) is connected to one of the dc-link rails (P, NP, N) and the other terminal(s) is (are) operationally connected to the phase output node 110. The first main switching device $S_{11}$ is operable to turn on and turn off, and thereby to respectively connect and disconnect the dc-link rail 22 and the output node 110, in response to control signal(s) $G_{11}$ received from a control and driver circuitry, such as an inverter-specific ARCP switching controller $\mathbf{8}_1$ illustrated in FIG. 2. The second main switching device $S_{21}$ is operable to turn on and turn off, and thereby to respectively connect and disconnect the dc-link rail 24 and the output node 110, in response to control signal(s) $G_{21}$ received from the control and driver circuitry, such as the ARCP switching controller $\mathbf{8}_1$. All power sections 10*u*, 10*v*, and 10*w* of phase legs $U_1$, $V_1$ and $W_1$ in the ARCP inverter INV1 may be controlled by the same inverter-specific switching controller $\mathbf{8}_1$. Similarly, the exemplary half-bridge power section 10*u* of the ARCP inverter INV2 illustrated in FIG. 2 includes a pair of main or power switching devices $S_{12}$ and $S_{22}$, a first antiparallel diode $D_{12}$, and a first resonant capacitor $C_{12}$, a second antiparallel diode $D_{22}$, a second resonant capacitor $C_{22}$, and switching control signals $G_{12}$ and $G_{22}$ from a control and driver circuitry, such as an inverter specific ARCP switching controller $\mathbf{8}_2$. All power sections 10*u*, 10*v*, and 10*w* of phase legs $U_2$, $V_2$ and $W_2$ in the ARCP inverter INV2 may be controlled by the same inverter-specific switching controller $\mathbf{8}_2$. In embodiments, the switching devices $S_{11}$, $S_{12}$, $S_{21}$ and $S_{22}$ may be an insulated-gate bipolar transistor (IGBT), or another type of semiconductor switching device, such as an integrated gate-commutated thyristor (IGCT), a metal-oxide-semiconductor field-effect transistor (MOSFET), or a silicon carbide (SiC) MOSFET to name several examples.

In operation, when the first main switch $S_{11}/S_{12}$ is turned on (to a conductive state), a first switch current $I_{s11}/I_{s12}$ can flow between the dc-link rail 22 and the output node 110. Similarly, when the second main switching device $S_{21}/S_{22}$ is turned on (to a conductive state), a second switch current $I_{s21}/I_{s22}$ can flow between the output node 110 and the dc-link rail 24. On the other hand, when the first main switching device $S_{11}/S_{12}$ is turned off (to a non-conductive state), the first switch current $I_{s11}$ will not flow in the switch-forward direction between the dc-link rail 22 and the output node 110, although a current $I_{d11}/I_{d12}$ may flow in the switch-reverse direction through the first anti-parallel diode $D_{11}/D_{12}$ of the first main switching device $S_{11}/S_{12}$. Similarly, when the second main switching device $S_{21}/S_{22}$ is turned off (to a non-conductive state), the second switch current $I_{s21}/I_{s22}$ will not flow in the switch-forward direction between the output node 110 and the dc-link rail 24, although a current $I_{d21}/I_{d22}$ may flow in the switch-reverse direction through the anti-parallel diode $D_{21}/D_{22}$ of the second switching device $S_{21}/S_{22}$. Thus, by turning on and off and closing the first main switching device $S_{11}/S_{12}$ and the second main switching device $S_{21}/S_{22}$, the output voltage at the output node 110 will be controlled or commutated to be either the voltage P from the dc-link rail 22 or the voltage N from the dc-link rail 24. The purpose of the resonant capacitors $C_{11}/C_{12}$ and $C_{21}/C_{22}$ is to limit the voltage slew rate of the output node; this ensures that the voltages $U_{c11}/U_{c12}$ and $U_{c21}/U_{c22}$ across the main switching devices $S_{11}/S_{12}$ and $S_{21}/S_{22}$ do not significantly change during turn-off such that the main switching devices are turned off at essentially zero-voltage.

The exemplary half-bridge power section 10*u* of the ARCP inverter INV1 illustrated in FIG. 2 further includes an auxiliary circuit comprising a resonant inductor $L_1$ and a bidirectional auxiliary switch $S_{aux1}$ connected in series between the neutral point NP1 and the output node 110. The auxiliary switch $S_{aux1}$ is operable to turn on and turn off, and thereby to respectively connect and disconnect the neutral point and the output node 110, in response to control signals received from the control and driver circuitry, such as the ARCP switching controller $\mathbf{8}_1$. The auxiliary switch $S_{aux1}$ can behave like a bidirectional thyristor: it can be triggered into conduction, and it turns off if or before the current tries to reverse its direction. In embodiments, the bidirectional auxiliary switch $S_{aux1}$ may be implemented with a pair of ordinary switching devices connected back-to-back, for example in a common-emitter or common-collector configuration and provided with anti-parallel diodes. FIG. 2 illustrates an exemplary auxiliary switch $S_{aux1}$ comprising a first auxiliary switching device $Sa_{11}$ and a second auxiliary switching device $Sa_{21}$ in a common-emitter series connection, a first anti-parallel diode $Da_{11}$ connected across the first auxiliary switching device $Sa_{11}$, and a second antiparallel diode $Da_{21}$ connected across the second auxiliary switching device $Sa_{21}$. One of the two auxiliary switching devices $Sa_{11}$ and $Sa_{21}$ is turned on and conducting at a time, as is one of the two antiparallel diodes $Da_{11}$ and $Da_{21}$, in response to control signals $Ga_{11}$ and $Ga_{21}$ received from a control and driver circuitry, such as an ARCP switching controller $\mathbf{8}_1$ illustrated in FIG. 2. In each case, the auxiliary current $I_{a1}$ will flow through one diode in series with one switch. The auxiliary switching devices in the auxiliary circuit are turned on and off at zero-current. When the first auxiliary switching device $Sa_{11}$ is turned on and the second switching device $Sa_{21}$ is turned off, the auxiliary current $I_{a1}$ will flow in one direction through $Sa_{11}$ and $Da_{21}$. When the first auxiliary switching device $Sa_{11}$ is turned off and the second switching device $Sa_{21}$ is turned on, the auxiliary current $I_{a1}$ will flow in the opposite direction through $Sa_{21}$ and $Da_{11}$. The auxiliary circuit is only used when the output node 110 is required to commutate from one voltage rail to the other. The auxiliary circuit functions by creating a pulse of current that, in combination with the resonant capacitors, is used to slew the output voltage on the output node 110. Similarly, the exemplary half-bridge power section $\mathbf{10}_A$ of the ARCP inverter INV2 illustrated in FIG. 2 further includes an auxiliary circuit comprising a resonant inductor $L_2$ and a bidirectional auxiliary switch $S_{aux2}$ connected in series between the neutral point $NP_2$ and the output node 110. In embodiments, the auxiliary switch $S_{aux2}$ may be implemented with a pair of ordinary switches and antiparallel diodes in a similar manner as the auxiliary switch $S_{aux1}$. FIG. 2 illustrates an exemplary auxiliary switch $S_{aux2}$ comprising a first auxiliary switching device $Sa_{12}$ and a second auxiliary switching device $Sa_{22}$ in a series connection, a first antiparallel diode $Da_{12}$ connected across the first auxiliary switching device $Sa_{12}$, and a second antiparallel diode $Da_{22}$ connected across the second auxiliary switching device $Sa_{22}$. One of the two auxiliary switching devices $Sa_{12}$ and $Sa_{22}$ is turned on and conducting at a time, as is one of the two antiparallel diodes $Da_{12}$ and $Da_{22}$, in response to control signals $Ga_{21}$ and $Ga_{22}$ received from a control and driver circuitry, such as an ARCP switching controller 82 illustrated in FIG. 2.

The ARCP switching control $\mathbf{8}_1 \ldots \mathbf{8}_n$ illustrated in FIGS. 1 and 2 refers generally to any control functions, logic, hardware, firmware, software, etc. required to control main and auxiliary switching devices in the ARCP phase leg(s) based on a PWM signal or PWM signals. Given a PWM signal, a standard hard-switching inverter does not need too much additional logic to form a complete inverter drive system. At a minimum, the direct PWM signal is sent to one switch while the complement of the PWM input signal is sent to the other switch in that phase. The ARCP on the other hand, requires more than the PWM modulation and control: it requires an additional more complex control, particularly due to the auxiliary circuit and the auxiliary switch(es).

FIG. 3 is a schematic block diagram of an exemplary embodiment of an ARCP switching controller $\mathbf{8}_1$ having a PWM modulator 82 and ARCP control functions 84 separated. In the illustrated example, the ARCP control 84 may include a dedicated ARCP control module $\mathbf{841}_U$, $\mathbf{841}_V$, and $\mathbf{841}_W$ adapted to provide control signals, such as $G_{11}$, $G_{21}$, $G_{a11}$ and $G_{a21}$ to each ARCP phase leg $U_1$, $V_1$ and $W_1$, respectively, based on a respective PWM signal $PWM_U$, $PWM_V$ and $PWM_W$ received from the PWM modulator 82. The ARCP control 84, or the respective ARCP control module $\mathbf{841}_U$, $\mathbf{841}_V$, and $\mathbf{841}_W$, may have to provide for instance the following functions for each phase leg $U_1$, $V_1$ and $W_1$: Activation of the correct auxiliary switch before commutating the main switches, controlling the boost time, ensuring that the main switches are switched at essentially zero-voltage, ensuring that the auxiliary switches are switched at zero-current, initially starting the switching sequence upon power up, etc. Depending on a selected ARCP control strategy, various sensing feedbacks FB may be required to implement the control algorithms, such as feedback from main switch zero-voltage sensors, auxiliary switch zero-current sensors, an auxiliary current sensor, an output (load) current sensor, a dc-link voltage sensor, a dc-link capacitor sensor(s), a neutral point voltage sensor, etc.

As used herein, the mode of commutating the output current $I_o$ from a diode to a switch (e.g., the current $I_{o1}$ from the diode $D_{21}$ to the switch $S_{11}$) in ARCP is called mode A and the mode of commutating the output current $I_o$ from a switch to a diode (e.g., the current $I_{o1}$ from the switch $S_{11}$ to the diode $D_{21}$) is called mode B, when the auxiliary circuit is involved in commutation and a boost current is provided. The mode of commutating high output current $I_o$ from a switch to diode, when the output current $I_o$ itself is sufficient to drive the output voltage from one dc-link rail to another and the auxiliary circuit is not involved, is called mode O herein.

Mode A commutation: If the output current $I_o$ is positive (Io>0) and the output voltage $U_o$ swings from the potential N (the dc-link 24) to the potential P (the dc-link 22), the lower diodes $D_{21}$ and $D_{22}$ commutate their currents ($I_{d21}$ and $I_{d22}$, respectively) to upper switches $S_{11}$ and $S_{12}$, respectively. If the output current $I_o$ is negative (Io<0) and the output voltage $U_o$ swings from the potential P (the dc-link 22) to the potential N (the dc-link 24), the upper diodes $D_{11}$ and $D_{12}$ commutate their currents ($I_{d11}$ and $I_{d12}$, respectively) to lower switches $S_{21}$ and $S_{22}$, respectively.

Mode B commutation: If the output current $I_o$ is positive (Io>0) and the output voltage $U_o$ swings from the potential P (the dc-link 22) to the potential N (the dc-link 24), the upper switches $S_{11}$ and $S_{12}$ commutate their currents to lower diodes $D_{21}$ and $D_{22}$, respectively. If the output current $I_o$ is negative (Io<0) and the output voltage $U_o$ swings from the potential N (the dc-link 24) to the potential P (the dc-link 22), the lower switches $S_{21}$ and $S_{22}$ commutate their currents to diodes $D_{11}$ and $D_{12}$, respectively.

In the following, examples of typical ARCP commutation in modes A and B are briefly described for a single phase, e.g., the ARCP phase $V_1$, of the ARCP inverter INV1. The commutation modes A and B of the corresponding the ARCP phase $V_2$ of the ARCP inverter INV2 are similar.

As an example of the mode A, a commutation of the positive output current $I_{o1}$ (Io>0) from the lower diode $D_{21}$ to the upper main switch $S_{11}$ and the output voltage $U_o$ from N to P will described with reference to FIGS. 4A-4F.

The diode $D_{21}$ is conducting the output current $I_{o1}$ ($=I_{d21}$), the diode $D_{21}$ supplying the output current $I_o$ (FIG. 4A) and switches $S_{11}$, $S_{a11}$ and $S_{a21}$ not conducting (turned off); during the commutation $S_{21}$ turns off and $S_{11}$ turns on.

Figure 4:
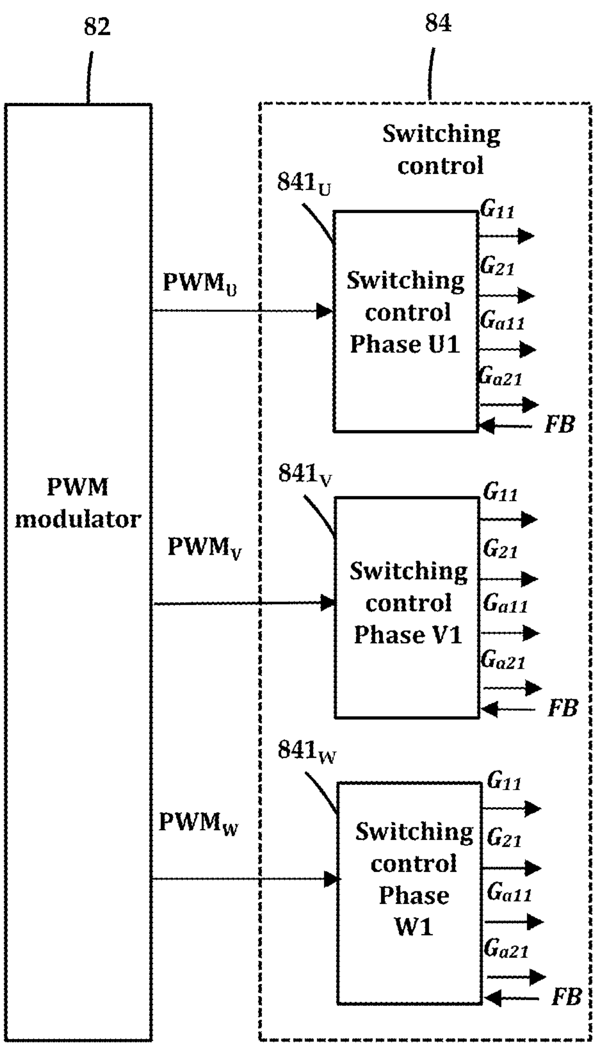
FIGS. 4A-4F are diagrams illustrating an example of mode A commutation.

The command for commutation arrives at time instant $t_{Ao}$. The auxiliary switch $Sa_{11}$ is turned on (at zero current) after a time interval $t_{wA1}$, which marks the start of the boosting interval $t_{bA1}$. The neutral point voltage $U_{NP1}$ is applied across the resonant inductor $L_1$, which causes the auxiliary current $I_{a1}$ through the resonant inductor $L_1$ to ramp up linearly (FIG. 4C), and the current $I_{d21}$ in diode $D_{21}$ decreases accordingly as $I_{d21}=I_{o1}-I_{a1}$ (FIG. 4A). In order to turn the diode $D_{21}$ off, the auxiliary current $I_{a1}$ must increase to the level of the output current $I_{o1}$ and even beyond (by a boosting current $I_{bA1}$), so that finally $I_{a1}=I_{o1}+I_{bA1}$. The boosting current portion $I_{bA1}$ of the total inductor current $I_{a1}$ is diverted to the switch $S_{21}$ parallel to the diode $D_{21}$ (FIG. 4B) while the load 6 takes its own, i.e., the output current $I_{o1}$.

The switch $S_{21}$ is turned off after a time interval $t_{bA1}$ (FIG. 4B), which marks the end of the boosting interval $t_{ba1}$, and the commutation swing of the output voltage $U_{c21}$ from N (zero) to P (the full $U_{dc}$) starts. The boosting current $I_{bA1}$ must be large enough to force the output potential swing from N to P, charging the capacitor $C_{21}$ and discharging the capacitor $C_{11}$. If there is a slight unbalance of the dc link voltage halves so that $U_{21}<U_{11}$, more boosting current is needed, and if $U_{21}>U_{11}$, less boosting current suffices.

The interval for the swing of $U_{C21}$ from zero to $U_{dc}$ has duration $t_{sA1}$.

$$t_{sA1} = \sqrt{L_1 C}\left[\cos^{-1}\left(\frac{U_{c21} - U_{dc}}{\sqrt{L_1/C}\, I_{pA}}\right) - \beta\right], \quad (1)$$

where $I_{pA1}$ is the peak value of the resonant part of the inductor current $$I_{pA1} = \sqrt{\frac{CU_{c21}^2}{L_1} + I_{bA1}^2}, \quad (2)$$

β is a phase angle $$\beta = \sin^{-1}(I_{bA}/I_{pA}), \quad (3)$$

and $C=C_{11}+C_{21}$ in the exemplary topology B shown in FIG. 2. The voltage change rate average is $du/dt=U_{dc}/t_{sA1}$.

When $U_{c21}$ reaches $U_{dc}$ and $U_{c11}$ reaches zero after a time interval $t_{sA1}$ (FIG. 3D), the portion of the auxiliary current $I_{a1}$ exceeding the output current $I_{o1}$ turns on the diode $D_{11}$ and is called $I_{tA1}$ (FIGS. 4C and 4D). The switch $S_{11}$ may be turned on as soon as $U_{c21}$ has reached $U_{dc}$. The boosting time $t_{bA1}$ may preferably be set to a value that minimizes the current $I_{tA1}$ close to zero. This way the losses and the reverse recovery current of $D_{11}$ will be minimized, as well as the duration of the commutation. This strategy narrows the window $t_{tAx}$. Thus, the precise timing of S11 turn-on is critical.

Because the diode $D_{11}$ and the switch $S_{11}$ clamp the output voltage to the positive dc potential P, the inductor current $I_{a1}$ decays linearly to zero during a time interval is $t_{tA}$ (FIG. 4C).

The current $I_{d11}$ decays first from $I_{tA1}$ to zero in time $t_{tAx}$, whereafter the switch current $I_{s11}$ increases linearly from zero to the load current level $I_{o1}$ (FIG. 4F) while $I_{a1}$ continues to decrease from $I_{o1}$ towards zero (FIG. 4C), after which the auxiliary diode Da21 turns off and the commutation sequence is finished.

The total duration of the commutation from the turn-on of the auxiliary switch $Sa_{21}$ to completion in mode A is $t_A - t_{bA1} + t_{sA1} + t_{tA1}$. There is a current in the auxiliary branch during this time interval.

As an example of the mode B, a commutation of the positive output current $I_{o1}$ (Io>0) from the upper main switch $S_{11}$ to the lower diode $D_{21}$ and a swing of the output voltage $U_o$ from N to P will described with reference to FIGS. 5A-5D.

The switch $S_{11}$ is conducting the output current $I_{o1}$ ($I_{o1}=I_{s11}$) (FIG. 5A) and switches $S_{21}$, $S_{a11}$ and $S_{a21}$ not conducting (turned off); during the commutation the upper switch $S_{11}$ turns off and the lower diode $D_{21}$ turns on.

The command for commutation arrives at time instant $t_{B0}$. After a waiting time $t_{wB1}$, the auxiliary switch $S_{a21}$ is turned on, and boosting current $I_{bB1}$ (in negative direction in the inductor $L_1$, positive direction in $S_{11}$) is linearly built up for a time $t_{bB1}$ (FIG. 5B).

The boosting current adds on top of the load current in the switch $S_{11}$, which turns off a total current of $I_{s11}=I_{o1}+I_{bB1}$ at the end of $t_{bB1}$ (FIG. 5A). The swing of $U_{c11}$ from zero to $U_{dc}$ starts (FIG. 5C). The output potential swing from P to N is a combination of the linear portion caused by $I_{o1}$ and a resonant portion caused by $I_{bB1}$. The duration of the swing is $t_{sB1}$ $$t_{sB1} = \sqrt{L_1 C}\left[\cos^{-1}\left(\frac{U_{c11} - U_{dc}}{\sqrt{L_1/C}\, I_{pB1}}\right) - \frac{\pi}{2} - \gamma\right], \quad (4)$$

where $I_{pB1}$ is the peak value of the resonant part of the inductor current, $$I_{pB1} = \sqrt{\frac{CU_{c11}^2}{L_1} + (I_{o1} - I_{bB1})^2}, \quad (5)$$

γ is a phase angle, $$\gamma = \tan^{-1}\left(\frac{\sqrt{C/L_1}\, U_{c11}}{-I_{o1} + I_{bB1}}\right), \quad (6)$$

and $C=C_{11}+C_{21}$. The voltage change rate average is $du/dt=U_{dc}/t_{sB1}$.

The remaining current $I_{a1}$ in the inductance at the end of the swing adds initially on top of the output current $I_{o1}$ in the diode $D_{21}$ so that $I_{d21}=I_{o1}+I_{tB}$. The diode current decays linearly to the final value $I_o$, as the inductor current reaches zero again after time $t_{tB}$ (FIGS. 5B and 5D). The total duration of the commutation in mode B from the triggering of Sa to completion is $t_B=t_{bB}+t_{sB}+t_B$.

The descriptions above for modes A and B assumed a positive direction of $I_o$. The operation for a negative $I_o$ ($I_o<0$) is identical, just the roles of $S_{11}$ and $S_{21}$, $D_{11}$ and $D_{21}$, and $U_{c11}$ and $U_{c21}$ are swapped from mode A to mode B, and vice versa.

The ARCP commutation for a corresponding phase in the plurality of parallel-connected ARCP inverter, e.g., for the ARCP phase $V_1$ of the ARCP inverter INV1 and the ARCP phase $V_2$ of the ARCP inverter INV2, can be initiated by similar commutation commands at the same time instant, e.g., at the time instant $t_{Ao}$ for mode A commutation and at the time instant $t_{Bo}$ for mode B commutation. In an ideal case, the output currents $I_{o1}$ and $I_{o2}$ of the parallel-connected ARCP inverter would be equal. However, the ideal behavior during commutations would require that the corresponding switches, e.g., $S_{11}$ and $S_{12}$, in the parallel operated inverter turn on at the same instant when commutating the output potential $U_o$, for example from N to P. Likewise, they should turn off at the same instant when commutating the output potential from P to N. Unfortunately, the parallel operated inverters do not behave similarly, for example due to parameter differences of switch components and differing impedances in parallel branches, the output currents from the parallel inverters can be unequal in magnitude. In other words, there can be uneven current sharing between the inverters. Due to thermal and economic reasons, it is of utmost importance that the parallel-connected inverters share the load current as evenly as possible.

According to an aspect of the invention, current sharing between the plurality of parallel-connected ARCP inverter legs is balanced by means of having an individual autonomous leg-specific boost current adjustment for each of the parallel-connected ARCP inverter legs for adjusting boost currents in a direction that a differential output current (e.g., $I_{do}=I_{o1}-I_{o2}$) is reduced, each individual boost current adjustment being dependent on the magnitude of the leg output current (e.g., $|I_{o1}|$ or $|I_{o2}|$) of the respective ARCP inverter leg only (e.g., phase leg $U_1$ or $U_2$ in FIG. 2). Ideally, when the current sharing is in balance, the output currents of the parallel-connected ARCP inverter legs (e.g., phase legs $U_1$ and $U_2$ in FIG. 2) are equal and their difference or a differential output current $I_{do}$ is zero, (e.g., $I_{do}=I_{o1}-I_{o2}=0$). Advantageously, the parallel ARCP inverter legs do not need to know about each other's currents or the differential current, but the balanced current sharing by adjusting boost current can be embodied relying only on information that is readily available separately in each of the parallel-connected legs: output current magnitude (e.g., $I_{o1}$ or $I_{o2}$), and optionally further information, such as one or more dc voltages (e.g., the dc link voltage $U_{dc}$, or the NP voltage $U_{dc}/2$, or dc link capacitor voltages $U_{11}$, $U_{21}$ or $U_{12}$, $U_{22}$). The benefit of an autonomous (or distributed or decentralized) control stems from avoiding the need for information exchange between higher-level control and lower-level control entities or between the lower-level control entities, such as the switching controls $\mathbf{8}_1$ and $\mathbf{8}_2$. The autonomous control system is usually also simpler and more modular compared to a centralized one, thus it easier to understand and maintain. Further, to keep the implementation cost effective, it would be preferable that there would not be any extra requirements for component selection or communication needs between the parallel-connected inverter units, i.e., the normal "single inverter units", such as the inverters INV1 and INV2, could be parallel as such. The challenge on the other hand is obvious: the autonomous units must operate with a limited information.

In embodiments, the individual boost current adjustment can be dependent on the magnitude of the leg output current (e.g., $|I_{o1}|$ or $|I_{o2}|$) of the respective ARCP inverter leg (e.g., phase leg $U_1$ or $U_2$ in FIG. 2) such that in an ARCP commutation mode A, the higher is the leg output current the lower is the boost current (e.g., $I_{bA1}$ or $I_{bA2}$) and/or the shorter is a boost time (e.g., $t_{sA1}$ or $t_{sA2}$), and in an ARCP commutation mode B, the higher is the leg output current the higher is the boost current (e.g., $I_{bA1}$ or $I_{bA2}$) and/or the longer is the boost time (e.g., $t_{sA1}$ or $t_{sA2}$).

In embodiments, the current sharing is balanced by manipulating the effective volt-second difference via voltage swing time adjustments that are resulting from individual autonomous boost current adjustments in each of the parallel-connected inverter-legs (e.g., phase leg $U_1$ and $U_2$ in FIG. 2).

In embodiments, the individual autonomous boost current adjustment can be dependent on the magnitude of the leg output current (e.g., $|I_{o1}|$ *or* $|I_{o2}|$) of the respective ARCP inverter leg (e.g., phase leg $U_1$ or $U_2$ in FIG. 2) such that in an ARCP commutation mode A the higher is the leg output current the later and/or slower is the output voltage swing, and such that in an ARCP commutation mode B, the higher is the leg output current the earlier and/or faster is the output voltage swing. If the output currents of the legs had equal magnitudes, the autonomous boost current adjustments of the legs would (independently from each other) result in commutating their output voltages to swing approximately similar manner, e.g., approximately simultaneously and/or at a same rate. If the output currents of the legs had different magnitudes, the autonomous boost current adjustments of the legs would (independently from each other) result in commutating their output voltages swing differently depending on their output current magnitudes in manner that in a direction that a differential output current (e.g., $I_{do}=I_{o1}-I_{o2}$) is reduced. In other words, these differences in the timely behavior of the output voltages (e.g., $U_{c21}$ and $U_{c22}$, referred to the N potential in FIG. 2) would create an effective volt-second difference to the loop inductance ($\Delta L=L_{o1}+L_{o2}$) in a direction that tends to reduce the output current difference $I_{do}$.

In embodiments, boost current and thereby the timely behavior of output voltage swings, e.g., voltage swing times, are adjusted by boost time adjustments. Adjusting the boost time leads to a desired change in the boost current, which in turn affects the voltage swing time. The Equations (1) and (4) presented above for the swing times $t_{sA}$ and $t_{sB}$ indicate that the swing times depend on the boost currents $I_{bA}$ and $I_{bB}$. Further, it can be shown that the difference of the swing times $t_{sA1}$ and $t_{sA2}$ of the ARCP inverter legs INV1 and INV2 for the commutation mode A, and the difference of the swing times $t_{sB1}$ and $t_{sB2}$ of the ARCP inverter legs INV1 and INV2 for the commutation mode B have an influence on the total timing differences $\Delta t_A$ and $\Delta t_B$ between the ARCP inverter legs INV1 and INV2 for the commutation modes A and B, respectively. Further, it can be shown that the total timing differences $\Delta t_A$ and $\Delta t_B$ relate to the increments $\Delta I_{doA}$ and $\Delta I_{doB}$ of the differential output current $I_{do}$ during the commutations.

In embodiments, each individual boost current adjustment has the same predetermined dependence on the magnitude of leg output current of the respective ARCP inverter leg. In other words, all parallel-connected ARCP legs may have a common rule defining a variable boost current of each individual leg in function of the individual leg's output current magnitude.

Figure 6:
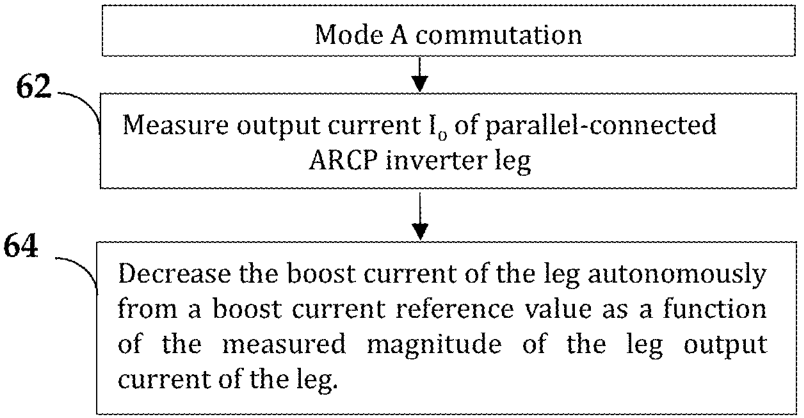
FIGS. 6 and 7 are flow diagrams illustrating examples of autonomous boost current adjustments according to exemplary embodiments for a parallel-connected ARCP inverter leg in mode A and mode B commutations, respectively.

In embodiments, in an ARCP commutation mode A, the boost current in each parallel-connected ARCP inverter leg is autonomously decreased from a reference value as a function of the actual measured value of the leg output current magnitude of the respective leg, as illustrated in steps 62 and 64 in an exemplary flow chart shown in FIG. 6. Thereby, an inverter leg with a higher output current magnitude will decrease its boost current more than an inverter leg with a lower leg output current magnitude.

For example, an autonomous adjustment of a boost current in the ARCP mode A (output current commutated from a diode to a switch) may be implemented by incorporating a factor $k_{IA}$, which is positive and less than 1 (could be a constant), as a multiplier of $I_o$ in the reference boost time calculations in both legs, so that the reference boost times would be calculated as follows:

$$t_{bA,r1}=(k_{IA}|I_{o1}|+I_{bA,r})L/U_{21} \tag{7}$$

$$t_{bA,r2}=(k_{IA}|I_{o2}|+I_{bA,r})L/U_{22} \tag{8}$$

wherein $t_{bA.r1}$ is the reference boost time of the ARCP inverter leg U1;

$t_{bA.r2}$ is the reference boost time of the ARCP inverter leg U2;

$I_{o1}$ is the leg output current of the ARCP inverter leg U1;

$I_{o2}$ is the leg output current of the ARCP inverter leg U2;

$k_{IA}$ is a multiplier factor, $0 \le k_{IA} < 1$;

$I_{bA,r}$ is a reference boost current;

$U_{21}$ is a dc voltage across the dc link capacitor $C_{d21}$ of the leg U1; and $U_{22}$ is a dc voltage across the dc link capacitor $C_{d22}$ of the leg U2.

Now the actual boost currents $I_{bA1}$ and $I_{bA2}$ in the legs U1 and U2, respectively, will be $$I_{bA1} = \frac{t_{bA,r1} U_{21}}{L} - |I_{o1}| = |I_{o1}|(k_{IA} - 1) + I_{bA,r} \tag{9}$$

$$I_{bA2} = \frac{t_{bA,r2} U_{22}}{L} - |I_{o2}| = |I_{o2}|(k_{IA} - 1) + I_{bA,r} \tag{10}$$

The difference in boost currents of the legs U1 and U2 will be $$I_{bA1} - I_{bA2} = (|I_{o1}| - |I_{o2}|)(k_{IA} - 1) \tag{11}$$

Because $k_{1A}<1$ and $|I_{o1}|>|I_{o2}|$, then $|I_{bA2}|>|I_{bA1}|$.

In embodiments, the voltage $U_{dc}/2$ may be used in place of the voltages $U_{21}$ and $U_{22}$ in equations (7)-(10), assuming that the NP unbalance would be insignificant or controlled to insignificant levels.

Figure 7:
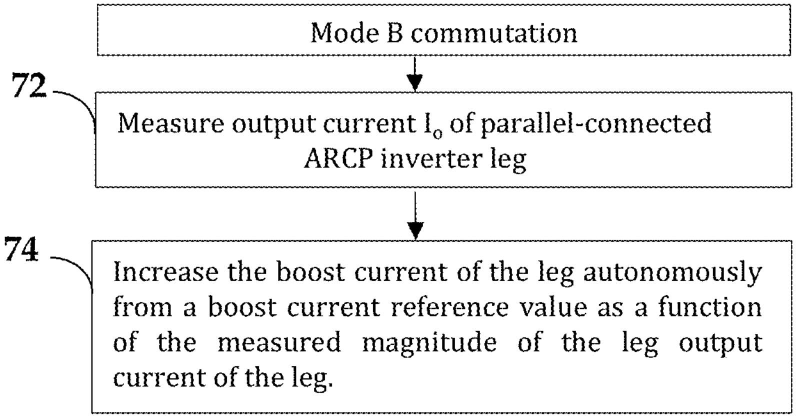

In embodiments, in an ARCP commutation mode B, the boost current in each parallel-connected ARCP inverter leg is autonomously increased a reference value as a function of the actual measured value of the leg output current of the respective leg, as illustrated in steps 72 and 74 in an exemplary flow chart shown in FIG. 7. Thereby, an inverter leg with a higher output current will increase its boost current more than an inverter leg with a lower leg output current.

For example, an autonomous adjustment of a boost current in the ARCP mode B (output current commutated from a switch to a diode) may be implemented by manipulating the reference boost current $I_{bB,r}$ with a term $k_{IB}|I_o|$ which varies with the magnitude of the output current. The factor $k_{IB}$ is a positive number (can be a constant). Now the inverter legs would determine their respective boost current references as $$I_{bB,r1} = I_{bB,min} + k_{IB}|I_{o1}| \tag{12}$$

$$I_{bB,r2} = I_{bB,min} + k_{IB}|I_{o2}| \tag{13}$$

where $I_{bB.r1}$ is the reference boost current of the ARCP inverter leg U1;

$I_{bB.r2}$ is the reference boost current of the ARCP inverter leg U2;

$I_{o1}$ is the leg output current of the ARCP inverter leg U1;

$I_{o2}$ is the leg output current of the ARCP inverter leg U2;

$k_{IB}$ is a multiplier factor, $k_{IB} \ge 0$; and $I_{bB,min}$ is a minimum boost current that is deemed necessary if $I_o$ is zero.

The reference boost times $t_{bB,r1}$ and $t_{bB,r2}$ of the inverter legs U1 and U2, respectively, may be calculated as usual:

$$t_{bB,r1} = I_{bB,r1}\, L/U_{11} \tag{14}$$

-continued $$t_{bB,r2} = I_{bB,r2}\, L/U_{21} \tag{15}$$

where $U_{11}$ is a dc voltage across the dc link capacitor $C_{d11}$ of the leg U1; and $U_{12}$ is a dc voltage across the dc link capacitor $C_{d12}$ of the leg U2.

Now the actual boost currents $I_{bA1}$ and $I_{bA2}$ in the legs U1 and U2, respectively, will be $$I_{bB1} = I_{bB,r1} \tag{16}$$

$$I_{bB2} = I_{bB,r2} \tag{17}$$

The difference in boost currents of the legs U1 and U2 will be $$I_{bB1} - I_{bB2} = I_{bB,r1} - I_{bB,r2} = k_{IB}(|I_{o1}| - |I_{o2}|) \tag{18}$$

Because $k_{IB}>1$ and $|I_{o1}|>|I_{o2}|$, then $|I_{bB2}|>|I_{bB1}|$.

In embodiments, the voltage $U_{dc}/2$ may be used in place of the voltages $U_{11}$ and $U_{12}$ in equations (14)-(15), assuming that the NP unbalance would be insignificant or controlled to insignificant levels.

FIGS. 8A-8E show signal diagrams illustrating an example of the effect of the boost current (and boost time) adjustment according to exemplary embodiments for two ARCP inverter legs (e.g., inverter legs U1 and U2 shown in FIG. 2) connected in parallel. More specifically, FIGS. 8A-8E are simplified signal diagrams that illustrate a principle of controlling the swing times via a boost current reduction in mode A and a boost current increase in mode B in proportion to the output current magnitude and how the adjustment in boost current level affects the speed of the voltage commutation. Otherwise, the ARCP commutation in modes A and B for each leg may be as normal, for example as described above with reference to FIGS. 4A-4F and 5A-5D for a single phase, e.g., the ARCP phase $V_1$, of the ARCP inverter INV1. Same reference symbols in FIGS. 4A-4F, 5A-5D and 8A-8E refer to same voltages, currents, and times.

FIG. 8A depicts the identical PWM commands (initiate commutation mode B/mode A) on a carrier cycle basis received by the autonomous boost current adjustment units (e.g., switching controls $\mathbf{8}_1$ and $\mathbf{8}_2$) of the parallel connected legs (e.g., legs U1 and U2) of ARCP inverters (e.g., INV1 and INV2) from a higher-layer controller (e.g., a motor control 86). FIGS. 8B and 8D depict the auxiliary currents $I_{a1}$ and $I_{a2}$ of the legs U1 and U2, respectively. For simplicity, the auxiliary currents $I_{a1}$ and $I_{a2}$ are drawn to show the boost intervals $t_{bB1}$ and $t_{bB2}$ or $t_{bA1}$ and $t_{bA2}$ only. FIGS. 8C and 8F depict the output voltage $U_{c21}$ and $U_{c22}$ of the legs U1 and U2, respectively. For simplicity, the voltage swings of $U_{c21}$ and $U_{c22}$ of are represented by linear slopes. The output currents $I_{o1}$ and $I_{o2}$ are assumed negative in the diagrams. The magnitude of $I_{o1}$ is larger than the magnitude of $I_{o2}$.

The command for mode B commutation arrives to both ARCP legs U1 and U2 at time instant $t_{B0}$. After a waiting time $t_{wB1}$, the auxiliary switch $S_{a11}$ is turned on, and the auxiliary current $I_{a1}$ is linearly built up to the level $I_{bB1}$ for a boost time $t_{bB1}$ (FIG. 8B), and similarly, after a waiting time $t_{wB2}$, the auxiliary switch $S_{a12}$ is turned on, and the auxiliary current $I_{a1}$ is linearly built up to the level $I_{bB2}$ for a boost time $t_{bB2}$ (FIG. 8D). The boost times $t_{bB2}$ and $t_{bB2}$ and/or the respective boost currents $I_{bB1}$ and $I_{bB2}$ may be calculated according to equations (12)-(17), for example. As $I_{o1}$ is larger than $I_{o2}$ in mode B commutation, the boost time $t_{bB1}$ is longer that the boost time $t_{bB2}$ and the boost current $I_{bB1}$ is higher than the boost current $I_{bB2}$, which results in the swing time $t_{sB2}$ of $U_{C22}$ being slower than the swing time $t_{sB1}$ of $U_{C21}$ (FIGS. 8B and 8E).

The command for mode A commutation arrives to both ARCP legs U1 and U2 at time instant $t_{A0}$. After a waiting time $t_{wA1}$, the auxiliary switch $S_{a21}$ is turned on, and the auxiliary current $I_{a1}$ is linearly built up for a boost time $t_{bA1}$ (FIG. 8B), and similarly, after a waiting time $t_{wA2}$, the auxiliary switch $S_{a22}$ is turned on, and the auxiliary current $I_{a2}$ is linearly built up for a boost time $t_{bA2}$ (FIG. 8D). The boost times $t_{bA1}$ and $t_{bA2}$ and/or the respective boost currents $I_{bA1}$ and $I_{bA2}$ may be calculated according to equations (7)-(10), for example. As $I_{o1}$ is larger than $I_{o2}$ in mode A commutation, the boost time $t_{bA1}$ is longer than the boost time $t_{bA2}$ and the boost current $I_{bA1}$ is higher than the boost current $I_{bA2}$, which results in the swing time $t_{sA1}$ of $U_{c21}$ being slower than the swing time $t_{sA2}$ of $U_{C22}$ (FIGS. 8B and 8E).

The effective (pulse) durations $t_{peff1}$ and $t_{peff2}$ of the voltage swings $U_{C21}$ and $U_{C22}$, respectively, are shown in the bottom of the diagrams in FIG. 8E. Because $t_{peff1}$ is longer than $t_{peff2}$, output current $I_{o1}$ will have a positive increment, reducing its magnitude (as $I_{o1}$ is negative). Likewise, output current $I_{o2}$ will have a negative increment, increasing its magnitude (as $I_{o2}$ is negative).

The switching control and boost current adjustment techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The description and the related drawings are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A power converter system, comprising two or more converter legs connected in parallel between a common dc system and a common ac system or between two common dc systems, wherein commutations of the parallel-connected converter legs are initiated by simultaneous commutation commands, a control arrangement configured to balance the current sharing between the parallel-connected converter legs, wherein the parallel-connected converter legs are auxiliary resonant commutated pole (ARCP) converter legs, particularly ARCP half-bridge legs, and wherein the control arrangement is configured to balance the current sharing between the parallel-connected ARCP converter legs by means of having an individual autonomous leg-specific boost current adjustment for each of the parallel-connected ARCP converter legs for adjusting boost currents in a direction that a differential output current is reduced, wherein each individual boost current adjustment is dependent on the magnitude of the leg current of the respective ARCP converter leg only.

2. The power converter system as claimed in claim 1, wherein each individual boost current adjustment is dependent on the leg current of the respective ARCP converter leg to autonomously adjust a boost current and/or a boost time of the respective parallel-connected ARCP converter leg, and/or a timely behaviour of a voltage swing of the respective parallel-connected ARCP converter leg.

3. The power converter system as claimed in claim 1, wherein each individual boost current adjustment is configured to be dependent on the magnitude of the leg current of the respective ARCP converter legs such that in an ARCP commutation mode A the higher is the magnitude of the leg current the later and/or slower is the voltage swing, and in an ARCP commutation mode B, the higher is the magnitude of the leg current the earlier and/or faster is the voltage swing.

4. The power converter system as claimed in claim 1, wherein each individual boost current adjustment is configured to be dependent on the magnitude of the leg current of the respective ARCP converter leg such that in an ARCP commutation mode A, the higher is the magnitude of the leg current the lower is the boost current and/or the shorter is a boost time, and in an ARCP commutation mode B, the higher is the magnitude of the leg current the higher is the boost current and/or the longer is the boost time.

5. The power converter system as claimed in claim 1, wherein each individual boost current adjustment has the same predetermined dependence on the leg current of the respective ARCP converter leg.

6. The power converter system as claimed in claim 1, wherein, in an ARCP commutation mode A, the boost current in each parallel-connected ARCP converter leg is autonomously decreased from a reference value as a function of the actual value of the leg current of the respective leg in such a way that an converter leg with a higher output current will decrease its boost current more than an converter leg with a lower leg current.

7. The power converter system as claimed in claim 1, wherein, in the ARCP commutation mode A, each individual boost current adjustment is dependent on the magnitude of the leg current of the respective ARCP converter leg approximately according to an equation wherein $$I_{bAn} = |I_{on}|(k_{IA} - 1) + I_{bA,r}$$

n is an index $I_{bAn}$ is the boost current of the ARCP converter leg n $I_{on}$ is the leg current of the ARCP converter leg n $k_{IA}$ is a multiplier factor, $0 \leq k_{IA} < 1$ $I_{bA,r}$ is a reference boost current.

8. The power converter system as claimed in claim 1, wherein, in an ARCP commutation mode B, the boost current in each parallel-connected ARCP converter leg is autonomously increased from a reference value as a function of the actual value of the leg current of the respective leg in such a way that an converter leg with a higher leg current will increase its boost current more than an converter leg with a lower leg current.

9. The power converter system as claimed in claim 1, wherein, in the ARCP commutation mode B, each individual boost current adjustment is dependent on the magnitude of the leg current of the respective ARCP converter leg approximately according to an equation $$I_{bBn} = I_{bB,min} + k_{IB}|I_{on}|$$

wherein n is an index $I_{bBn}$ is the boost current of the ARCP converter leg n $I_{on}$ is the leg current of the ARCP converter leg n $k_{IB}$ is a multiplier factor, $k_{IB} \geq 0$ $I_{bB,min}$ is a minimum boost current that is deemed necessary if $I_o$ is zero.

10. The power converter system as claimed in claim 1, wherein the power converter system comprises two or more ARCP converters, each of the ARCP converters comprising one or more ARCP converter phase legs, wherein the parallel-connected ARCP converter legs are the corresponding ARPC converter phase legs of the two or more converters connected in parallel.

11. The power converter system as claimed in claim 10, wherein each of two or more ARCP converters comprises a dc-link having a first DC rail and a second DC rail, and a series connection of at least two dc-link capacitances between the two rails of the dc-link, a midpoint of the series connection forming a neutral point (NP) of the dc-link, and wherein each of said ARCP converter phase legs includes:

a series connection of at least two main switching devices between a first DC voltage rail and a second DC voltage rail to alternatively connect the first and second dc-link rails to a phase leg output or input by the PWM modulation from the control apparatus, a resonant capacitor connected in parallel with each of the at least two main switching devices in such manner that at least one terminal of the capacitor is connected to one of the dc-link rails or to the phase leg output or input, and a series connection of a resonant inductance and at least one bi-directional auxiliary switch between said phase leg output or input and said neutral point, and wherein the control arrangement is configured to the control arrangement is configured to control the switching of the at least one bi-directional auxiliary switches to balance the current sharing between the parallel-connected ARCP converter phase legs by means of having the individual autonomous boost current adjustment for each of the parallel-connected ARCP converter phase legs, wherein each individual boost current adjustment has the same predetermined dependence on the magnitude of the leg current of the respective ARCP converter leg.

12. The power converter system as claimed in claim 10, wherein the control arrangement comprises converter-specific controllers for the two or more ARCP converters, each of the converter-specific controllers being configured to provide the autonomous individual boost current adjustment for each of the ARCP converter phase legs of the respective ARCP converter.

13. A power converter system, comprising two or more converter legs connected in parallel between a common dc system and a common ac system or between two common dc systems, wherein commutations of the parallel-connected converter legs are initiated by simultaneous commutation commands, a control arrangement configured to balance the current sharing between the parallel-connected converter legs, wherein the parallel-connected converter legs are auxiliary resonant commutated pole (ARCP) converter legs, particularly ARCP half-bridge legs, and wherein the control arrangement is configured to balance the current sharing between the parallel-connected ARCP converter legs by means of having an individual autonomous leg-specific boost current adjustment for each of the parallel-connected ARCP converter legs for adjusting boost currents in a direction that a differential output current is reduced, wherein each individual boost current adjustment is dependent on the magnitude of the leg current of the respective ARCP converter leg only such that, in an ARCP commutation mode A, the higher is the magnitude of the leg current the lower is the boost current and/or the shorter is a boost time, and in an ARCP commutation mode B, the higher is the magnitude of the leg current the higher is the boost current and/or the longer is the boost time.

14. The power converter system as claimed in claim 13, wherein each individual boost current adjustment has the same predetermined dependence on the leg current of the respective ARCP converter leg.

15. The power converter system as claimed in claim 13, wherein, in an ARCP commutation mode A, the boost current in each parallel-connected ARCP converter leg is autonomously decreased from a reference value as a function of the actual value of the leg current of the respective leg in such a way that an converter leg with a higher output current will decrease its boost current more than an converter leg with a lower leg current.

16. The power converter system as claimed in claim 13, wherein, in an ARCP commutation mode B, the boost current in each parallel-connected ARCP converter leg is autonomously increased from a reference value as a function of the actual value of the leg current of the respective leg in such a way that an converter leg with a higher leg current will increase its boost current more than an converter leg with a lower leg current.

17. A power converter system, comprising two or more converter legs connected in parallel between a common dc system and a common ac system or between two common dc systems, wherein commutations of the parallel-connected converter legs are initiated by simultaneous commutation commands, a control arrangement configured to balance the current sharing between the parallel-connected converter legs, wherein the parallel-connected converter legs are auxiliary resonant commutated pole (ARCP) converter legs, particularly ARCP half-bridge legs, and wherein the control arrangement is configured to balance the current sharing between the parallel-connected ARCP converter legs by means of having an individual autonomous leg-specific boost current adjustment for each of the parallel-connected ARCP converter legs for adjusting boost currents in a direction that a differential output current is reduced, wherein each individual boost current adjustment is dependent on the magnitude of the leg current of the respective ARCP converter leg only such that, in an ARCP commutation mode A the higher is the magnitude of the leg current the later and/or slower is the voltage swing, and in an ARCP commutation mode B, the higher is the magnitude of the leg current the earlier and/or faster is the voltage swing.

* * * * *